US012778847B2

(12) United States Patent
Battle et al.

(10) Patent No.: US 12,778,847 B2
(45) Date of Patent: Nov. 3, 2026

(54) MEASURED FLUID DISPENSER

(71) Applicant: AMS LLC, Canton, OH (US)

(72) Inventors: Matthew Battle, Canton, OH (US); Adrian Bischoff, Chapel Hill, NC (US)

(73) Assignee: AMS LLC, Canton, OH (US)

( * ) Notice: Subject to any disclaimer, the term of this patent is extended or adjusted under 35 U.S.C. 154(b) by 148 days.

(21) Appl. No.: 18/922,231

(22) Filed: Oct. 21, 2024

(65) Prior Publication Data

US 2026/0108424 A1 Apr. 23, 2026

Related U.S. Application Data

(60) Provisional application No. 63/593,633, filed on Oct. 27, 2023.

(51) Int. Cl.
*A61J 1/22* (2006.01)
*G01F 11/28* (2006.01)

(52) U.S. Cl.
CPC ............... *A61J 1/22* (2013.01); *G01F 11/286* (2013.01)

(58) Field of Classification Search
CPC ................................. A61J 1/22; G01F 11/286
See application file for complete search history.

(56) References Cited

U.S. PATENT DOCUMENTS 4,143,794 A * 3/1979 Stratford ............... G01F 11/286 222/207
4,747,521 A * 5/1988 Saffron ................. G01F 11/286 222/207
4,971,226 A * 11/1990 Donoghue ............. B29C 45/33 222/207
5,476,181 A * 12/1995 Seidler .................. G01F 11/286 215/208
2016/0244222 A1* 8/2016 Sterling ............... B65D 47/122

* cited by examiner

*Primary Examiner* — Donnell A Long
(74) *Attorney, Agent, or Firm* — Renner, Otto, Boisselle & Sklar, LLP

(57) ABSTRACT

An adjustable measured fluid dispenser is provided for dispensing a fluid from a storage container. The adjustable measured fluid dispenser includes a measurement cap having multiple divided fillable volumes with different volumes, a tube, and a redirecting cap. The redirecting cap includes a redirecting structure for directing fluid received from the storage container via the tube into one of the fillable volumes. The redirecting cap is positionable relative to the measurement cap, such that the redirecting cap may be used to select one of the fillable volumes and to direct fluid from the tube into the selected volume.

19 Claims, 6 Drawing Sheets

20

FIG. 9
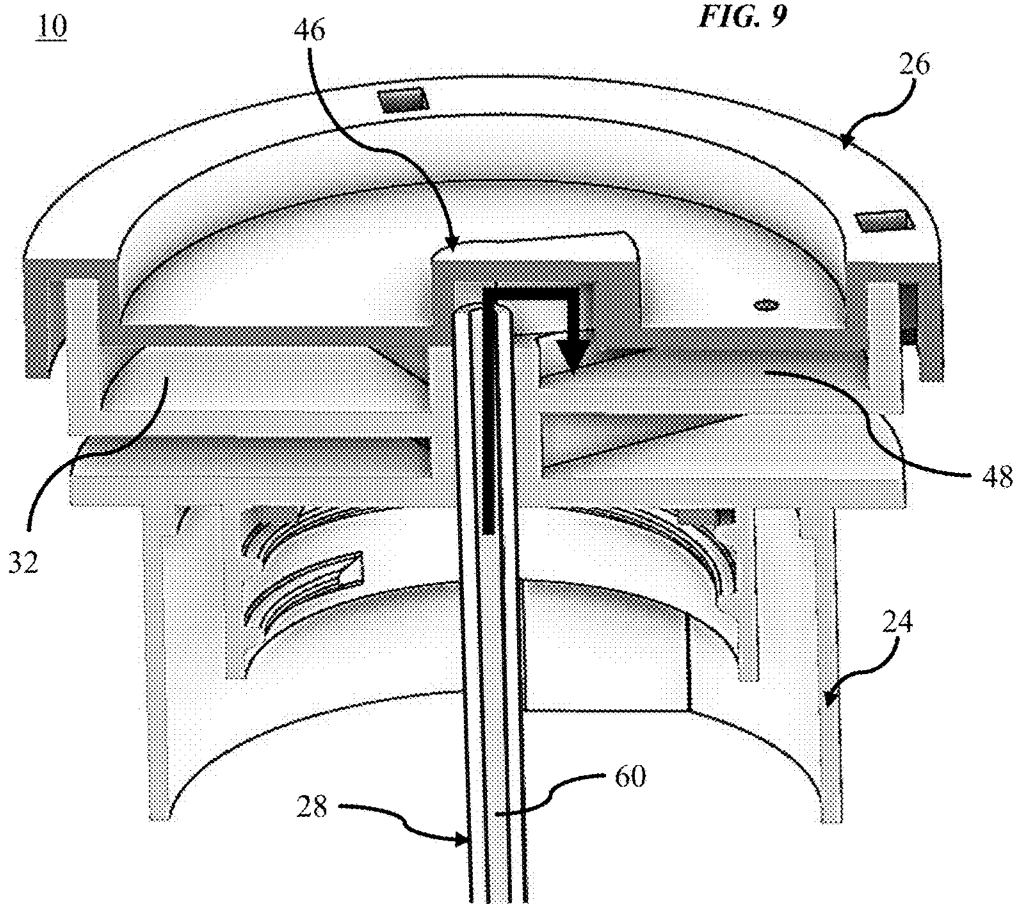
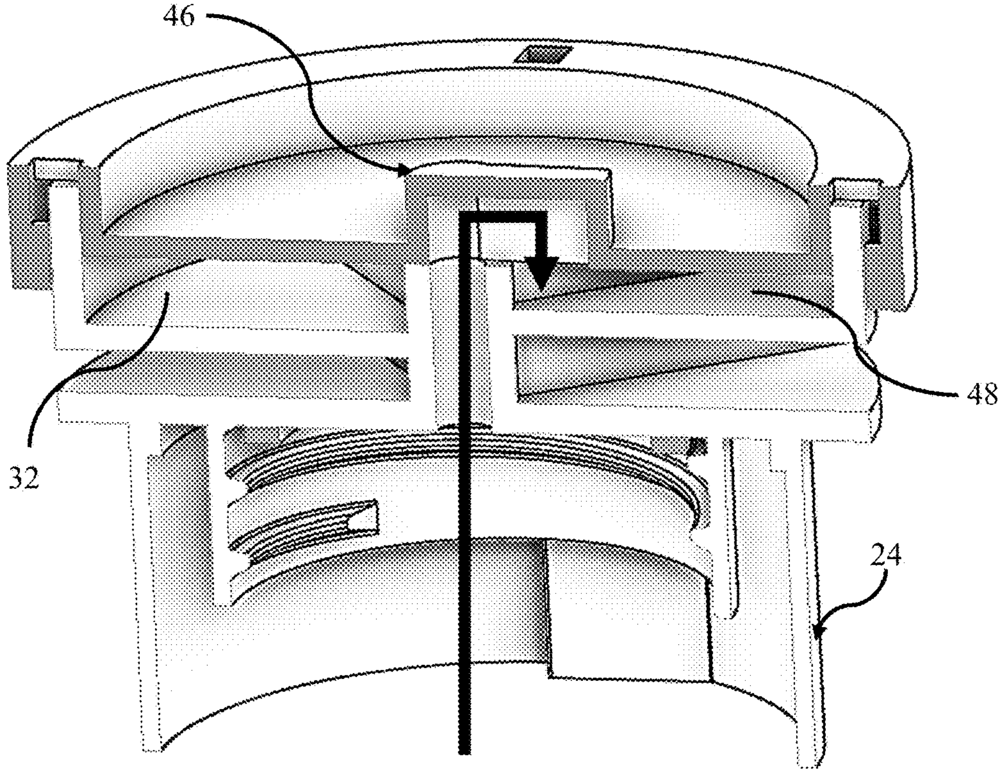
FIG. 10

MEASURED FLUID DISPENSER

RELATED APPLICATIONS

This application claims the benefit of U.S. Provisional Application No. 63/593,633 filed on Oct. 27, 2023, which is hereby incorporated herein by reference in its entirety.

TECHNICAL FIELD

The present disclosure relates generally to fluid dispensers, and more particularly to a fluid dispenser for measuring and dispensing fluid contained in a container.

BACKGROUND

There are many ways to measure fluid from a container. One such conventional way is by using a measuring cup including delineated markers along the side of the cup to visually indicate to a user how much fluid is contained therein and dispensed from a bottle. The delineations on measuring cups are often very small and integrally formed into the plastic, which may cause some users difficulty in visually seeing the demarcations on the cup, and which could result in an improper dosage of medicine, for example.

SUMMARY

The present disclosure provides an adjustable measured fluid dispenser for dispensing a fluid from a storage container using a measurement cap having multiple divided fillable volumes, a tube for fluidly coupling the measurement cap to the storage container, and a redirecting cap for selecting one of the fillable volumes and directing fluid from the tube into the selected volume.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 9 is a cross-sectional side perspective view of the adjustable measured fluid dispenser of FIG. 7.

FIG. 10 is a cross-sectional side perspective view of the measurement cap combined with the redirecting cap of FIG. 7.

DETAILED DESCRIPTION

The principles and aspects of the present disclosure have particular application to fluid dispensers for use with liquid medications, and thus will be described below chiefly in this context. It is understood, however, that the principles and aspects of the present disclosure may be applicable for other applications for other types of fluids where it is desirable to measure and dispense a preselected quantity of fluid from a container with improved accuracy and ease.

The present disclosure provides an adjustable measured fluid dispenser for dispensing a fluid from a storage container. The adjustable measured fluid dispenser includes a measurement cap having multiple divided fillable volumes with different volumes, a tube, and a redirecting cap. The redirecting cap includes a redirecting structure for directing fluid received from the storage container via the tube into one of the fillable volumes. The redirecting cap is positionable relative to the measurement cap, such that the redirecting cap may be used to select one of the fillable volumes and to direct fluid from the tube into the selected volume.

Figure 1:
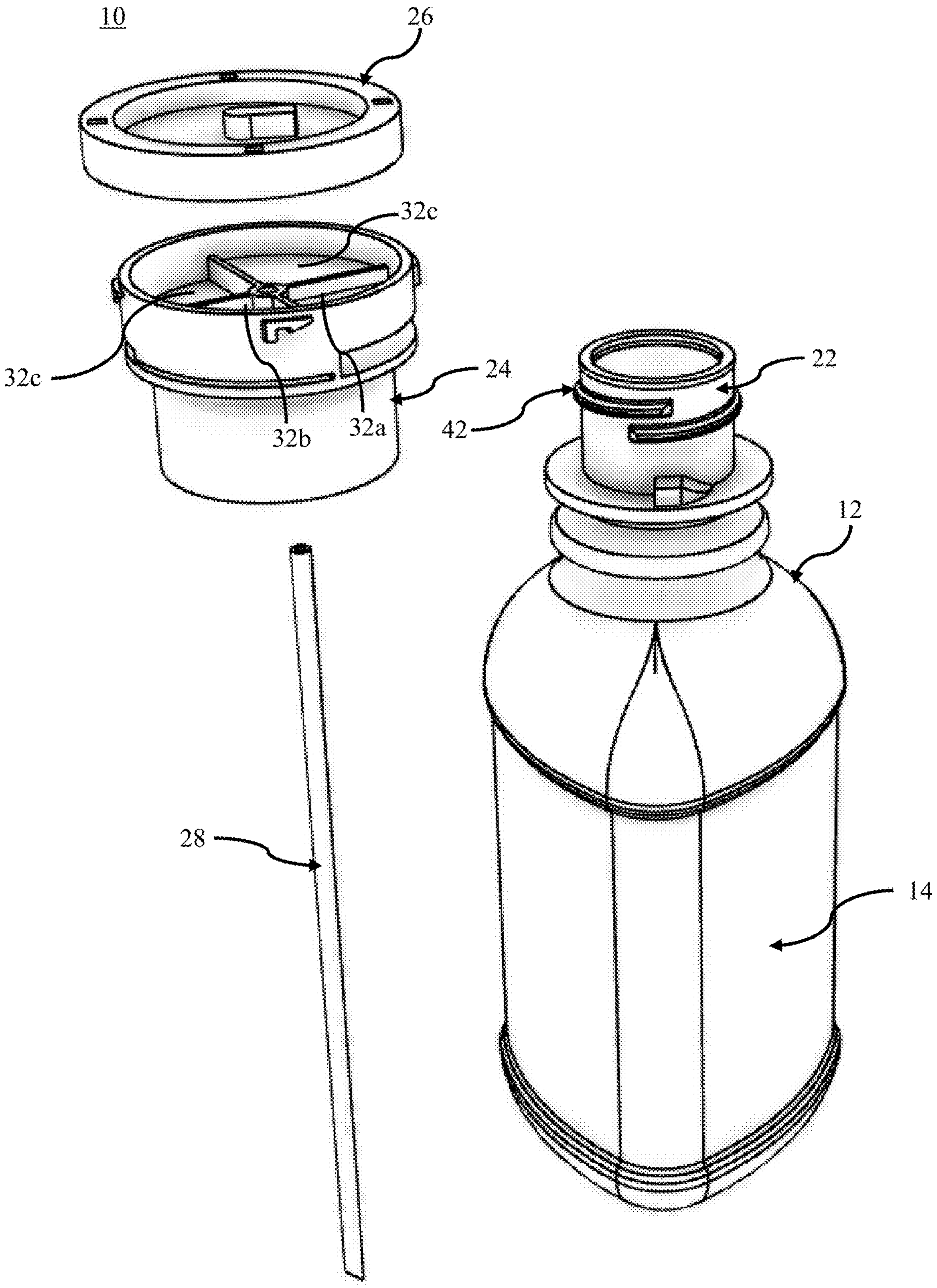
FIG. 1 is a exploded perspective view of an exemplary adjustable liquid medicine dispenser including an adjustable measured fluid dispenser and a storage container.

Turning to FIG. 1, an exemplary embodiment is shown of an adjustable liquid medicine dispenser 10 for dispensing measured amounts of a fluid. The adjustable liquid medicine dispenser 10 includes a storage container 12 having a storage chamber 14 for storing a fluid, and an adjustable measured fluid dispenser 20. The adjustable measured fluid dispenser 20 dispenses the fluid from the storage chamber 12 via a neck 22 of the storage container 12. For example, the storage container 12 may be a liquid medicine bottle and the stored fluid may be a liquid medicine (e.g., acetaminophen, ibuprofen, etc.).

The adjustable measured fluid dispenser 20 includes a measurement cap 24, a redirecting cap 26, and a tube 28. The measurement cap 24 includes a measurement chamber 30 including multiple divided fillable volumes 32 separated by a dividing wall 34. Each of the fillable volumes 32 are separated from the other fillable volumes 32 by the dividing wall 34. That is, the dividing wall 34 may separate the measurement chamber 30 into the fillable volumes 32. Each of the fillable volumes 32 have a specific volume capacity, such that filling the fillable volume 32 to capacity with the dispensed fluid results in the fillable volume 32 holding an amount of the dispensed fluid matching the specific volume capacity of the fillable volume. The specific volume capacity of each of the fillable volumes 32 may be indicated on an outer surface of the measurement cap 24.

Figure 2:
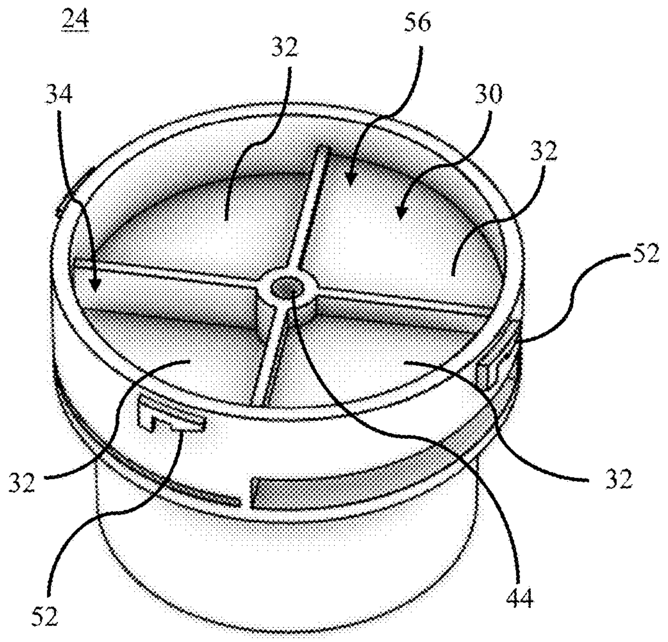
FIG. 2 is top perspective view of a measurement cap of the adjustable measured fluid dispenser of FIG. 1.
Figure 3:
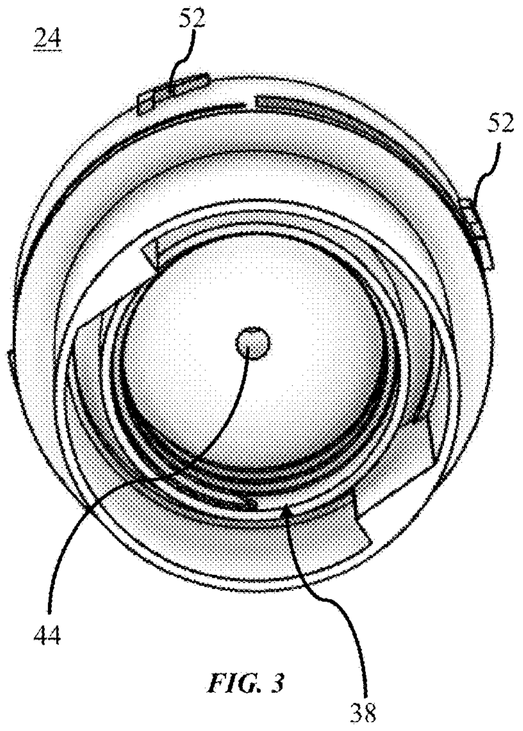
FIG. 3 is a bottom perspective view of the measurement cap of FIG. 2.

With exemplary reference to FIGS. 2 and 3, the measurement chamber 30 may have a circular shape divided into wedge shaped fillable volumes 32 by the dividing wall 34. As shown, the dividing wall 34 may be viewed as multiple walls extending from a center of the measurement chamber 30. The volume capacity of each of the fillable volumes 32 may be determined based on a cross sectional area of the fillable volume and a depth of the fillable volume. For example, in FIG. 1 the fillable volumes **32*a*, 32*b*, 32*c*, 32*d*** having the same cross sectional area, but different depths. The different depths of the fillable volumes 32, results in a different volume capacity for the fillable volumes 32.

In another embodiment, the fillable volumes 32 may have varying cross sectional areas. For example, the fillable volumes 32 may have a same depth and a difference in the volume capacity of the fillable volumes 32 may be determined by the difference in cross sectional area of the fillable volumes 32.

The measurement cap 24 may engage with the neck 22 of the storage container 12 via an interlocking structure 38. That is, the interlocking structure engages with the neck 22 of the storage container 12 to maintain a position of the measurement cap 24 relative to the storage container 12. For example, the neck 12 may have a finish 42 for interacting with a child-proof cap. That is, the neck 12 may include a finish 42 (i.e., extending or recessed structures) for interacting with a child-proof cap found on standard liquid medicine bottles (e.g., as shown in FIG. 1).

Figure 4:
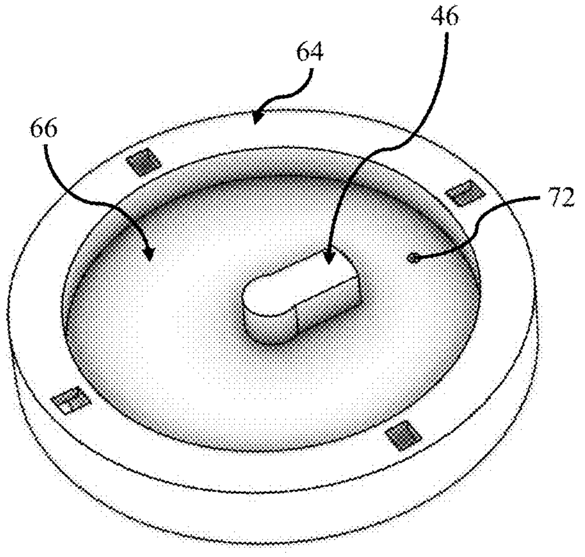
FIG. 4 is top perspective view of a redirecting cap of the adjustable measured fluid dispenser of FIG. 1.
Figure 5:
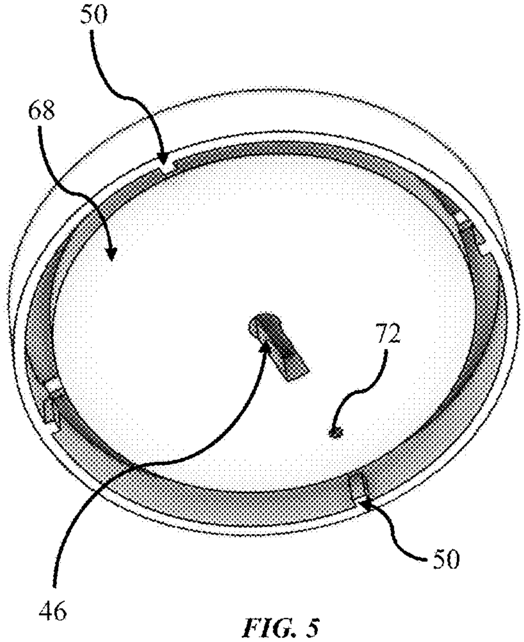
FIG. 5 is a bottom perspective view of the redirecting cap of FIG. 4.

With exemplary reference to FIGS. 4 and 5, the adjustable measured fluid dispenser's 20 redirecting cap 26 includes a redirecting structure 46 for directing the dispensed fluid from the storage chamber 14 into a selected volume 48 of the fillable volumes 32. For example, a cross sectional view of the adjustable measured fluid dispenser 20 is shown in FIG. 2. As shown, the redirecting structure 46 may be a channel in the redirecting cap 26 that is shaped to direct the fluid from the tube 28 into the selected volume 48. As is described in further detail below, by changing a position of the redirecting cap 26, the redirecting cap 26 may be positioned to select the selected volume 48 (i.e., the fillable volume 32 that the fluid is dispensed into).

The redirecting cap 26 includes an engaging structure 50 for mating with a mating structure 52 of the measurement cap 24 and maintaining a position of the redirecting cap 26 relative to the measurement cap 24. The engaging structure 50 mates with the mating structure 52, such that the redirecting cap 26 is positionable about a top surface 56 of the measurement cap 24 for selecting one of the fillable volumes 32 as the selected volume 48.

Figure 6:
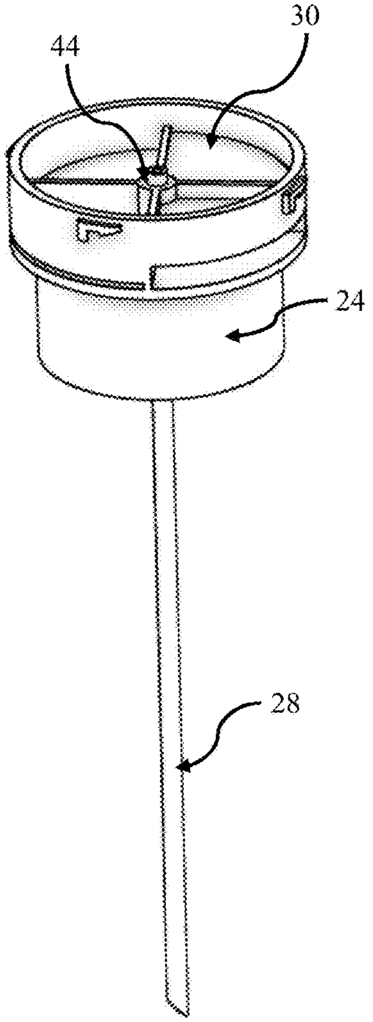
FIG. 6 is a top perspective view of the measurement cap combined with the tube of FIG. 1.
Figure 7:
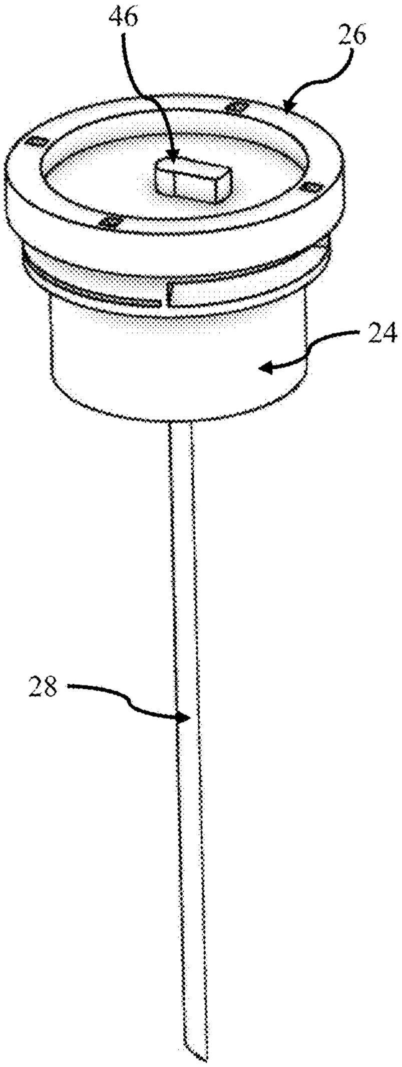
FIG. 7 is a top perspective view of the adjustable measured fluid dispenser of FIG. 1.
Figure 8:
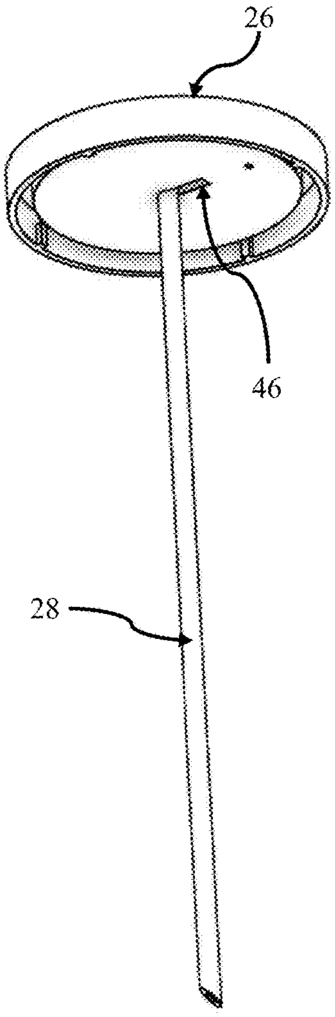
FIG. 8 is a bottom perspective view of the redirecting cap combined with the tube of FIG. 1.
Figure 11:
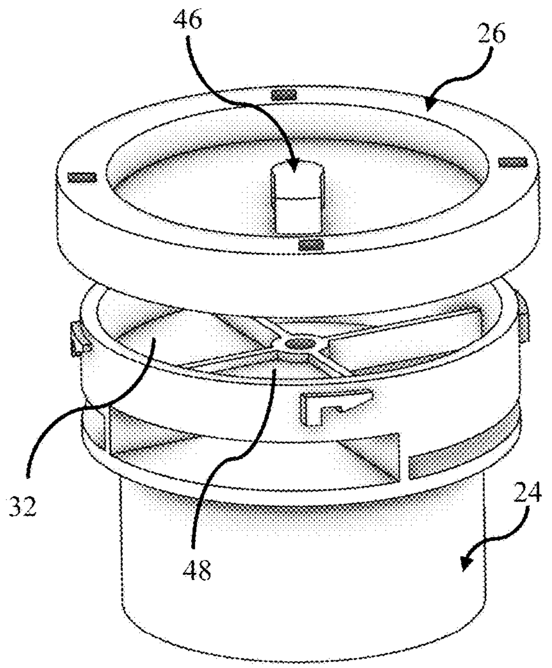
FIGS. 11-14 are top perspective views of the redirecting cap in different rotational positions relative to the measurement cap illustrating selecting different fillable volumes.
Figure 12:
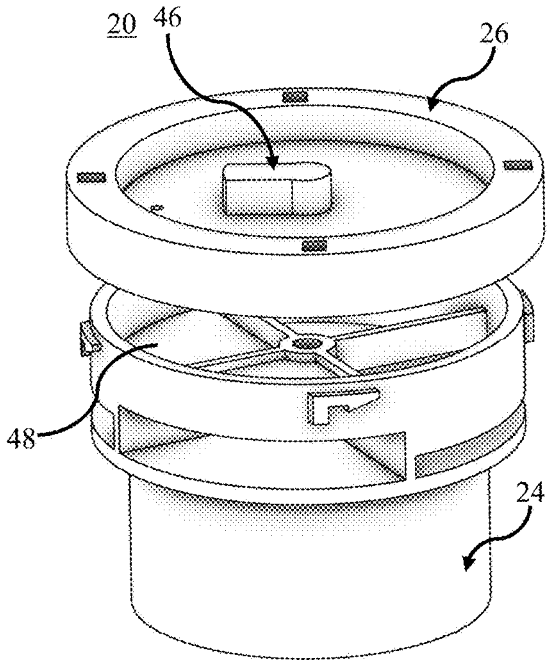
Figure 13:
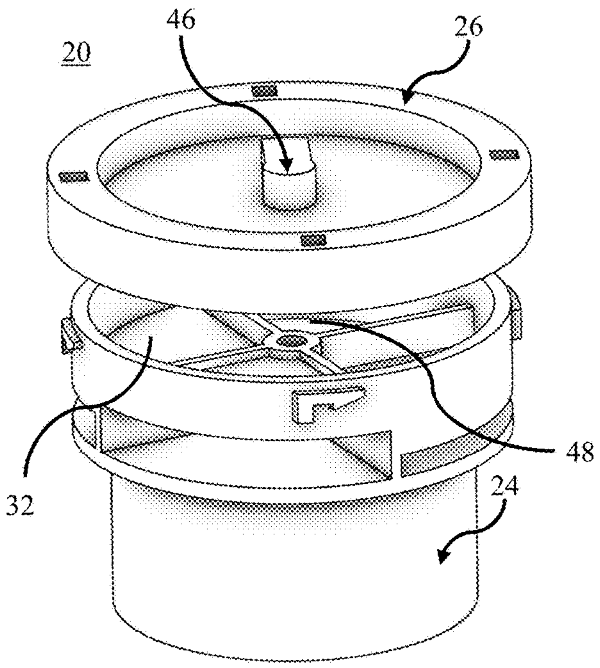
Figure 14:
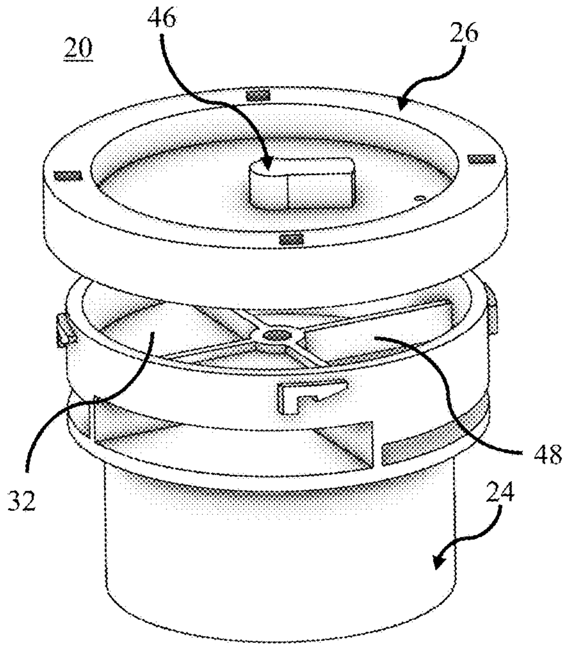

With exemplary reference to FIGS. 6-8, the measurement cap 24 includes a channel 44 extending through the measurement cap 24. This channel 44 is used to direct the dispensed fluid from the storage chamber 14 into the measurement chamber 30. The tube 28 extends through the channel 44 of the measurement cap 24. For example, FIG. 6 shows the tube 28 extending through the channel 44 of the measurement cap 24 without the redirecting cap 26. FIG. 7 shows the redirecting cap 26 added to the tube 28 and the measurement cap 24 of FIG. 6. FIG. 8 shows the interaction between the tube 28 and the redirecting cap 26 from FIG. 7. That is, in FIG. 8, the measurement cap 24 has been removed to show the positioning of the tube 28 relative to the redirecting cap 26. As shown, the tube 28 may be inserted into the redirecting structure 46 of the redirecting cap 26.

Turning to FIGS. 9 and 10, the fluid coupling between the measurement cap 24, redirecting cap 26, and tube 28 is shown. As shown in FIG. 9, when the interlocking structure 38 is engaged with the neck 22 of the storage container 12 and when the engaging structure 50 is mated with the measurement cap 24, the redirecting structure 46 is fluidly coupled with a lumen 60 of the tube 28. The black arrow shown in FIGS. 9 and 10 depicts the movement of fluid from the lumen 60 of the tube 28, into the redirecting structure 46 of the redirecting cap 26, and from the redirecting structure 46 into the selected volume 48 of the measurement cap 24. In FIG. 10, the tube 28 has been removed to show how the positioning of the measurement cap 24 relative to the redirecting cap 26 allows for fluid to move from the redirecting structure 46 into the selected fillable volume 48 of the measurement cap 24.

The positioning of the redirecting cap 26 selects the selected volume 48 by fluidly coupling the selected fillable volume 32 with the storage container 14 via the lumen 60 of the tube 28 and the redirecting structure 46 of the redirecting cap 26. For example, FIGS. 11-14 show four different positions of the redirecting structure 46 that result in selecting four different fillable volumes 32 as the selected volume 48 (e.g., by rotating the redirecting cap 26 relative to the measurement cap 24). By positioning the redirecting structure 46 so that it directs the fluid into one of the fillable volumes 32, the redirecting cap 26 may be used to select one of the fillable volumes 32.

As shown in FIGS. 11-14, the measurement cap 24 and redirecting cap 26 may include structures that limit positioning of the redirecting structure 46 relative to the fillable volumes 32 to ensure that fluid is directed from the storage container 14 into only one of the fillable volumes 32 as the selected volume 48. For example, to properly orient and guide the redirecting cap 26 relative to the measurement cap 24 for selecting one of the fillable volumes 32, the measurement cap 24 and the redirecting cap 26 may include corresponding guiding structures (e.g., guide slots and corresponding guide protrusions) that interact to maintain a position of the redirecting structure 46 in one of a discrete number of acceptable positions. The acceptable positions may be limited by the guiding structures, such that the redirecting structure 46 is fluidly coupled with one of the fillable volumes 32 (i.e., the selected volume 48). For example, in the embodiment shown in FIGS. 11-14, four guiding structures are present for fluidly coupling the redirecting structure 46 to one of the fillable volumes 32.

Turning back to FIGS. 4 and 5, the redirecting cap 26 may include a main body 64 having a top surface 66 and a bottom surface 68. When the engaging structure 50 is mated with the measurement cap 24, the bottom surface 68 of the redirecting cap 26 may form an upper boundary to the fillable volumes 32, such that the specific volume capacity of each of the fillable volumes 32 is defined by the bottom surface 68 of the redirecting cap 26, the dividing wall 34, and a top surface 56 of the measurement cap 24.

The main body 64 of the redirecting cap 26 may also include an overflow passage 72 extending between the top surface 66 and the bottom surface 68 of the main body 64. When an excessive fluid volume is directed into the selected volume 48 that exceeds the specific volume capacity of the selected volume 48, a portion of the excessive fluid volume may pass through the overflow passage 72 onto the top surface 66 of the redirecting cap 26.

The interlocking structure 38 may create a seal with the neck 22 of the storage container 12 when engaged. Due to this seal, squeezing the storage container 12 may reduce a volume of the storage chamber, causing the dispensed fluid to be propelled through the lumen 60 of the tube 28 towards the redirecting cap 26. In this way, a user may squeeze the bottle to cause the fluid to be moved from within the storage container 12 to the measurement chamber 30.

The redirecting cap 26 and the measurement cap 24 may each be made of a single piece. That is, both the redirecting cap 26 and the measurement cap 24 may be a monolithic structure. For example, the adjustable measured fluid dispenser 20 may be constructed using only two injection molded parts (i.e., the redirecting cap 26 and the measurement cap 24), the tube 28, and two die-cut seals.

The measurement chamber 30 may include at least three fillable volumes 32 having different volume capacities. The fillable volumes 32 may have any suitable capacity. For example, the fillable volumes 32 may include a specific volume capacity of 5 ml, 7.5 ml, and 10 ml. In one embodiment, the measurement chamber 30 may include four fillable volumes 32. The four fillable volumes 32 may have a specific volume capacity of 2.5 ml, 5 ml, 7.5 ml, and 10 ml. In an alternative embodiment, the four fillable volumes 32 may have a specific volume capacity of 5 ml, 7.5 ml, 10 ml, and 12.5 ml.

Each of the fillable volumes 32 may include a hydrophobic coating for improving removal of the dispensed fluid from the fillable volumes 32. For example, after filling the selected volume 48 with the dispensed fluid, a user may pour the dispensed fluid into a separate container, or the user may ingest the dispensed fluid directly. The hydrophobic coating may be used to reduce an amount of the dispensed fluid remaining in the selected volume 48 when the dispensed fluid is poured from the selected volume 48. That is, the hydrophobic coating may by reduce the amount of the fluid sticking to the surface of the fillable volumes 32 by repelling the fluid and minimizing adhesion.

In use, a user may position the redirecting cap 26 to select as a desired dosage the selected volume 48. The user may then squeeze the storage container 12 until the selected volume 48 is filled. The user may then remove the redirecting cap 26 from the measurement cap 24. The user may then dispense the fluid from the measurement cap 24. For example, the user may consume of the fluid directly from the measurement cap 24 or the user may pour the fluid from the measurement cap into a separate container before consuming the fluid.

Figure 15:
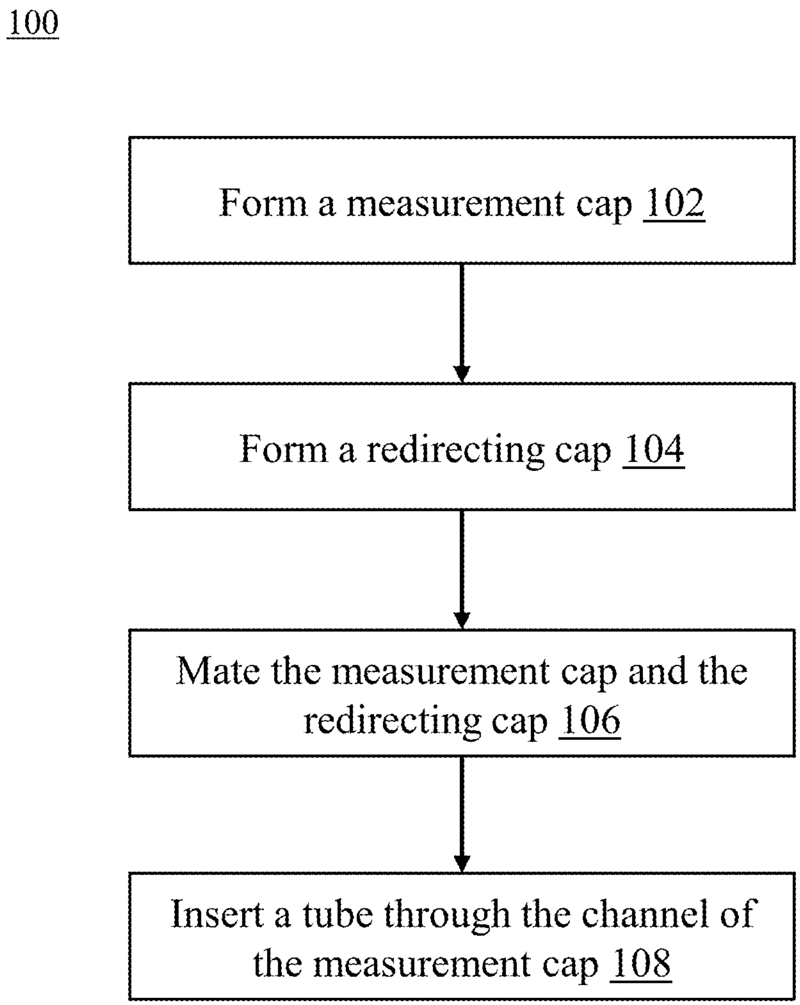
FIG. 15 is a flow diagram depicting a method of manufacturing an adjustable measured fluid dispenser for dispensing fluid from a storage chamber of a storage container via a neck of the storage container.

Turning to FIG. 15, a method 100 is shown for manufacturing an adjustable measured fluid dispenser 20 for dispensing fluid from a storage chamber 14 of a storage container 12 via a neck 22 of the storage container 12. In step 102, a measurement cap is formed by injection molding the measurement cap as a monolithic structure. In step 104, a redirecting cap is formed by injection molding the redirecting cap, such that the redirecting cap as a monolithic structure. In step 106, the engaging structure is mated with the measurement cap. In step 108, a tube is inserted through the channel of the measurement cap, such that the redirecting structure of the redirecting cap is fluidly coupled with a lumen of the tube.

The storage container 12 may be any suitable container or vessel, such as a bottle or the like, that is adapted to store a fluid, such as liquid medicine or the like. The storage container 12 may be made of flexible plastic that is easy to deform and squeeze by hand. In exemplary embodiments, the storage container 12 may be separate and distinct from the adjustable measured fluid dispenser 20, in which case the adjustable measured fluid dispenser 20 may be operably couplable to, and removable from, the storage container 12.

As shown, the measurement chamber 30 is at least partially formed by internal surfaces of a measurement cap 24 of the adjustable measured fluid dispenser 20. The measurement cap 24 may be any suitable container or vessel adapted to receive and contain a preselected quantity of fluid from the storage chamber 14 of the storage container 12. The measurement cap 24 and the measurement chamber 30 may have any suitable shape or form as may be desired for the particular application.

To provide sealing functionality between the storage chamber 14 and measurement chamber 30, the adjustable measured fluid dispenser 20 may include one or more suitable seals. For example, a gasket or O-ring seal may be disposed in a groove of the measurement cap 24 or the redirecting cap 26.

In the discussion above, the terms "upper", "lower", "top", "bottom," "end," "inner," "left," "right," "above," "below," "horizontal," "vertical," etc. refer to the measured fluid dispenser as viewed in a horizontal position, as shown in FIG. 1, for example. Such relative positional terms as used in this disclosure are understood to refer to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. An operable connection or coupling may include the entities being integral and unitary with each other.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An adjustable measured fluid dispenser for dispensing fluid from a storage chamber of a storage container via a neck of the storage container, the fluid dispenser comprising:
- a measurement cap including:
  - a measurement chamber including multiple divided fillable volumes separated by a dividing wall, wherein:
    - each of the fillable volumes are separated from the other fillable volumes by the dividing wall; and
    - each of the fillable volumes have a specific volume capacity, such that filling the fillable volume to capacity with the dispensed fluid results in the fillable volume holding an amount of the dispensed fluid matching the specific volume capacity of the fillable volume;
  - an interlocking structure configured to engage with the neck of the storage container to maintain a position of the measurement cap relative to the storage container; and
  - a channel extending through the measurement cap;
- a redirecting cap including:
  - a main body having a top surface and a bottom surface;
  - a redirecting structure formed in the bottom surface of the main body and configured to direct the dispensed fluid from the storage chamber into a selected volume of the fillable volumes; and
  - an engaging structure configured to mate with a mating structure of the measurement cap such that:
    - the engaging structure maintains a position of the redirecting cap relative to the measurement cap; and
    - a position of the redirecting cap relative to the fillable volumes of the measurement cap selects one of the fillable volumes as the selected volume; and
- a tube extending through the channel of the measurement cap, such that when the interlocking structure is engaged with the neck of the storage container and when the engaging structure is mated with the measurement cap:
  - the redirecting structure of the redirecting cap is fluidly coupled with a lumen of the tube; and
  - the position of the redirecting cap selects the selected volume by fluidly coupling the selected fillable volume with the storage container via the lumen of the tube and the redirecting structure of the redirecting cap so that the fluid directed by the redirecting structure flows into the selected fillable volume;
- wherein, when the engaging structure is mated with the measurement cap:
  - the bottom surface of the redirecting cap forms an upper boundary to the fillable volumes, such that the specific volume capacity of each of the fillable volumes is defined by the bottom surface of the redirecting cap, the dividing wall, and a top surface of the measurement cap;
  - the main body is supported by a top edge of the measurement cap such that:
    - the redirecting structure is positioned at an outlet end of the channel;
    - no portion of the redirecting cap extends into the channel; and
    - fluid exiting the channel is directed by the redirecting structure into the selected fillable volume.

2. The adjustable measured fluid dispenser according to claim 1, wherein the interlocking structure is configured to create a seal with the neck of the storage container when engaged, such that squeezing the storage container to reduce a volume of the storage chamber results in the dispensed fluid being propelled through the lumen of the tube towards the redirecting cap.

3. The adjustable measured fluid dispenser according to claim 1, wherein the redirecting cap is a monolithic structure and the measurement cap is a monolithic structure.

4. The adjustable measured fluid dispenser according to claim 1, wherein the storage container is a liquid medicine bottle and the neck has a finish configured to interact with a child-proof cap.

5. The adjustable measured fluid dispenser according to claim 1, wherein the fillable volumes include at least three fillable volumes having different volume capacities.

6. The adjustable measured fluid dispenser according to claim 1, wherein the fillable volumes include four fillable volumes.

7. The adjustable measured fluid dispenser according to claim 1, wherein, for each of the fillable volumes, a surface of the fillable volume defining the specific volume capacity of the fillable volume includes a hydrophobic coating.

8. A method of dispensing fluid from the measured fluid dispenser according to claim 1 comprising:
- positioning the redirecting cap to select as a desired dosage the selected volume;
- squeezing the storage container until the selected volume is filled; and
- removing the redirecting cap from the measurement cap;
- dispensing the fluid from the measurement cap.

9. The adjustable measured fluid dispenser according to claim 1, wherein:

the bottom surface of the main body includes only one or more recesses extending toward the top surface of the main body; and the redirecting structure comprises one of the one or more recesses.

10. An adjustable liquid medicine dispenser for dispensing measured amounts of liquid medicine comprising:

a liquid medicine bottle including a storage chamber for storing the liquid medicine;

an adjustable measured fluid dispenser for dispensing the liquid medicine from the storage chamber via a neck of the liquid medicine bottle, the fluid dispenser comprising:

a measurement cap including:

a measurement chamber including multiple divided fillable volumes separated by a dividing wall, wherein:

each of the fillable volumes are separated from the other fillable volumes by the dividing wall; and each of the fillable volumes have a specific volume capacity, such that filling the fillable volume to capacity with the dispensed liquid medicine results in the fillable volume holding an amount of the dispensed liquid medicine matching the specific volume capacity of the fillable volume;

an interlocking structure configured to engage with the neck of the liquid medicine bottle to maintain a position of the measurement cap relative to the liquid medicine bottle; and a channel extending through the measurement cap;

a redirecting cap including:

a main body having a top surface and a bottom surface;

a redirecting structure formed in the bottom surface of the main body and configured to direct the dispensed liquid medicine from the storage chamber into a selected volume of the fillable volumes; and an engaging structure configured to mate with a mating structure of the measurement cap such that:

the engaging structure maintains a position of the redirecting cap relative to the measurement cap; and a position of the redirecting cap relative to the fillable volumes of the measurement cap selects one of the fillable volumes as the selected volume; and a tube extending through the channel of the measurement cap, such that when the interlocking structure is engaged with the neck of the liquid medicine bottle and when the engaging structure is mated with the measurement cap:

the redirecting structure of the redirecting cap is fluidly coupled with a lumen of the tube; and the position of the redirecting cap selects the selected volume by fluidly coupling the selected fillable volume with the liquid medicine bottle via the lumen of the tube and the redirecting structure of the redirecting cap so that the liquid medicine directed by the redirecting structure flows into the selected fillable volume;

the main body is supported by a top edge of the measurement cap such that:

the bottom surface of the redirecting cap forms an upper boundary to the fillable volumes, such that the specific volume capacity of each of the fillable volumes is defined by the bottom surface of the redirecting cap, the dividing wall, and a top surface of the measurement cap;

wherein, when the engaging structure is mated with the measurement cap;

liquid medicine exiting the channel is directed by the redirecting structure into the selected fillable volume, no portion of the redirecting cap extends into the channel; and the redirecting structure is positioned at an outlet end of the channel.

11. The adjustable liquid medicine dispenser according to claim 10, wherein the main body of the redirecting cap includes an overflow passage extending between the top surface and the bottom surface of the main body, such that:

when an excessive fluid volume is directed into the selected volume exceeding the specific volume capacity of the selected volume, a portion of the excessive fluid volume passes through the overflow passage onto the top surface of the redirecting cap.

12. The adjustable liquid medicine dispenser according to claim 10, wherein the interlocking structure is configured to create a seal with the neck of the liquid medicine bottle when engaged, such that squeezing the liquid medicine bottle to reduce a volume of the storage chamber results in the dispensed liquid medicine being propelled through the lumen of the tube towards the redirecting cap.

13. The adjustable liquid medicine dispenser according to claim 10, wherein the redirecting cap is a monolithic structure and the measurement cap is a monolithic structure.

14. The adjustable liquid medicine dispenser according to claim 10, wherein the fillable volumes include at least three fillable volumes having different volume capacities.

15. A method of manufacturing an adjustable measured fluid dispenser for dispensing fluid from a storage chamber of a storage container via a neck of the storage container, the method comprising:

forming a measurement cap by injection molding as a monolithic structure the measurement cap, such that the measurement cap includes:

a measurement chamber including multiple divided fillable volumes separated by a dividing wall, wherein:

each of the fillable volumes are separated from the other fillable volumes by the dividing wall; and each of the fillable volumes have a specific volume capacity, such that filling the fillable volume to capacity with the dispensed fluid results in the fillable volume holding an amount of the dispensed fluid matching the specific volume capacity of the fillable volume;

an interlocking structure configured to engage with a neck of the storage container to maintain a position of the measurement cap relative to the storage container; and a channel extending through the measurement cap;

forming a redirecting cap by injection molding as a monolithic structure the redirecting cap, such that the redirecting cap includes:

a main body having a top surface and a bottom surface;

a redirecting structure formed in the bottom surface of the main body and configured to direct the dispensed fluid from the storage chamber into a selected volume of the fillable volumes; and an engaging structure configured to mate with a mating structure of the measurement cap such that:

the engaging structure maintains a position of the redirecting cap relative to the measurement cap; and a position of the redirecting cap relative to the fillable volumes of the measurement cap selects one of the fillable volumes as the selected volume;

mating the engaging structure with the measurement cap, such that:

fluid exiting the channel is directed by the redirecting structure into the selected fillable volume; and no portion of the redirecting cap extends into the channel; and the redirecting structure is positioned at an outlet end of the channel:

the main body is supported by a top edge of the measurement cap such that:

the bottom surface of the redirecting cap forms an upper boundary to the fillable volumes, such that the specific volume capacity of each of the fillable volumes is defined by the bottom surface of the redirecting cap, the dividing wall, and a top surface of the measurement cap; and inserting a tube through the channel of the measurement cap, such that the redirecting structure of the redirecting cap is fluidly coupled with a lumen of the tube.

16. The method according to claim 15, further comprising engaging the interlocking structure with the neck of the storage container, such that the tube extends into the storage chamber.

17. The method according to claim 15, wherein the redirecting cap is formed, such that a main body of the redirecting cap includes an overflow passage extending between a top surface and a bottom surface of the main body, such that:

when an excessive fluid volume is directed into the selected volume exceeding the specific volume capacity of the selected volume, a portion of the excessive fluid volume passes through the overflow passage onto the top surface of the redirecting cap.

18. The method according to claim 15, further comprising applying a hydrophobic coating to the fillable volumes.

19. An adjustable measured fluid dispenser for dispensing fluid from a storage chamber of a storage container via a neck of the storage container, the fluid dispenser comprising:

a measurement cap including:

a measurement chamber including multiple divided fillable volumes separated by a dividing wall, wherein:

each of the fillable volumes are separated from the other fillable volumes by the dividing wall; and each of the fillable volumes have a specific volume capacity, such that filling the fillable volume to capacity with the dispensed fluid results in the fillable volume holding an amount of the dispensed fluid matching the specific volume capacity of the fillable volume;

an interlocking structure configured to engage with the neck of the storage container to maintain a position of the measurement cap relative to the storage container; and a channel extending through the measurement cap;

a redirecting cap including:

a redirecting structure configured to direct the dispensed fluid from the storage chamber into a selected volume of the fillable volumes; and an engaging structure configured to mate with a mating structure of the measurement cap such that:

the engaging structure maintains a position of the redirecting cap relative to the measurement cap; and a position of the redirecting cap relative to the fillable volumes of the measurement cap selects one of the fillable volumes as the selected volume; and a tube extending through the channel of the measurement cap, such that when the interlocking structure is engaged with the neck of the storage container and when the engaging structure is mated with the measurement cap:

the redirecting structure of the redirecting cap is fluidly coupled with a lumen of the tube; and the position of the redirecting cap selects the selected volume by fluidly coupling the selected fillable volume with the storage container via the lumen of the tube and the redirecting structure of the redirecting cap, wherein;

the redirecting cap comprises a main body having a top surface and a bottom surface; and when the engaging structure is mated with the measurement cap, the bottom surface of the redirecting cap forms an upper boundary to the fillable volumes, such that:

the specific volume capacity of each of the fillable volumes is defined by the bottom surface of the redirecting cap, the dividing wall, and a top surface of the measurement cap the main body of the redirecting cap includes an overflow passage extending between the top surface and the bottom surface of the main body, such that:

when an excessive fluid volume is directed into the selected volume exceeding the specific volume capacity of the selected volume, a portion of the excessive fluid volume passes through the overflow passage onto the top surface of the redirecting cap.

* * * * *